(12) United States Patent
Kishi

(10) Patent No.: US 10,911,700 B2
(45) Date of Patent: Feb. 2, 2021

(54) IMAGE CAPTURING APPARATUS, IMAGE PROCESSING APPARATUS, AND METHOD

(71) Applicant: CANON KABUSHIKI KAISHA, Tokyo (JP)

(72) Inventor: Takuya Kishi, Tokyo (JP)

(73) Assignee: CANON KABUSHIKI KAISHA, Tokyo (JP)

(*) Notice: Subject to any disclaimer, the term of this patent is extended or adjusted under 35 U.S.C. 154(b) by 18 days.

(21) Appl. No.: 16/408,572

(22) Filed: May 10, 2019

(65) Prior Publication Data

US 2019/0364200 A1 Nov. 28, 2019

(30) Foreign Application Priority Data

May 24, 2018 (JP) .................................. 2018-099794

(51) Int. Cl.
*H04N 5/367* (2011.01)
*H04N 5/232* (2006.01)

(52) U.S. Cl.
CPC ......... *H04N 5/367* (2013.01); *H04N 5/23218* (2018.08); *H04N 5/23229* (2013.01); *H04N 5/23251* (2013.01); *H04N 5/23299* (2018.08)

(58) Field of Classification Search
CPC ........... H04N 5/23229; H04N 5/23299; H04N 5/367; H04N 5/3675
See application file for complete search history.

(56) References Cited

U.S. PATENT DOCUMENTS

2003/0133027 A1* 7/2003 Itoh ........................ H04N 5/367
348/246
2010/0110240 A1* 5/2010 Thebault .............. H04N 5/3675
348/246
2019/0296062 A1* 9/2019 Terauchi ................ H04N 5/367

FOREIGN PATENT DOCUMENTS

JP 2013-162173 A 8/2013

* cited by examiner

*Primary Examiner* — Daniel M Pasiewicz
(74) *Attorney, Agent, or Firm* — Cowan, Liebowitz & Latman, P.C.

(57) ABSTRACT

An imaging capturing apparatus comprises: an image sensor including a two-dimensional array of a plurality of pixels; and a processor configured to perform defective pixel correction on an image signal outputted from a defective pixel among the plurality of pixels. The processor changes a defective-pixel-correction parameter used in the defective pixel correction based on at least one of a moving velocity and a moving direction of a photographic angle of view of the image sensor.

17 Claims, 9 Drawing Sheets

FIG. 5A

<HORIZONTAL DIRECTION>
FIG. 5B

<VERTICAL DIRECTION>
FIG. 5C

<DIAGONAL DIRECTION>
FIG. 5D

FRAME N+1

FRAME N+2

IMAGE CAPTURING APPARATUS, IMAGE PROCESSING APPARATUS, AND METHOD

BACKGROUND OF THE INVENTION

Field of the Invention

The present invention relates to an image capturing apparatus, an image processing apparatus, and a method, and more specifically relates to an image capturing apparatus, an image processing apparatus, and a method for performing defective pixel correction.

Description of the Related Art

Video cameras including solid-state image sensors, such as charge-coupled device (CCD) image sensors and complementary metal-oxide semiconductor (CMOS) image sensors, are widely used for capturing images of targets. The image sensors of such video cameras may include defective pixels that output signals of abnormal levels resulting from damage incurred on pixels during production or by aging. Such video cameras usually have a defective pixel correction function for reducing the influence of such defective pixels on image quality and the like.

A typical defective pixel correction function performs a correction process depending on a result determining whether the defective pixel level is higher or lower than a predetermined level assigned to an imaging condition (such as the gain of the video camera). However, such a defective pixel correction function may perform the correction process in response to an imaging condition independent from the captured image data, and in such a case, performing the defective pixel correction process may conversely cause deterioration of the image quality (i.e., may result in improper correction or excessive correction). In particular, it is known that images of targets including high frequency components, such as a group of buildings in the background, are extremely prone to improper correction of defective pixels (for example, correcting pixels that should be black with white). In a case where the photographic angle of view shifts and/or the position and angle of a target including high-frequency components change, improper correction of defective pixels occur in accordance with the movement of the target, and this causes significant flickering of defective pixels in colors reversed from those of surrounding pixels.

Japanese Patent Laid-Open No. 2013-162173 discloses a technique of suppressing deterioration in image quality due to correction by determining the scene of an image from the captured image data and performing defective pixel correction based on the determined scene.

However, since the defective pixel correction according to Japanese Patent Laid-Open No. 2013-162173 is performed on the basis of a scene, it is not possible to reduce flickering in an image subjected to defective pixel correction due to a shift in the photographic angle of view and/or a change in the position and angle of a target.

SUMMARY OF THE INVENTION

The present invention has been made in consideration of the above situation, and performs more appropriate defective pixel correction even when the photographic angle of view shifts and/or the position and angle of a target change.

According to the present invention, provided is an imaging capturing apparatus comprising: an image sensor including a two-dimensional array of a plurality of pixels; and a processor configured to perform defective pixel correction on an image signal outputted from a defective pixel among the plurality of pixels, wherein the processor changes a defective-pixel-correction parameter used in the defective pixel correction based on at least one of a moving velocity and a moving direction of a photographic angle of view of the image sensor.

Further, according to the present invention, provided is an image capturing apparatus comprising: an image sensor including a two-dimensional array of a plurality of pixels; and a processor configured to perform defective pixel correction on an image signal outputted from a defective pixel among the plurality of pixels, wherein the processor changes a defective-pixel-correction parameter used in the defective pixel correction based on at least one of a moving velocity and a moving direction of a target in an image acquired by the image sensor.

Furthermore, according to the present invention, provided is an image processing apparatus that processes an image acquired by an image sensor including a two-dimensional array of a plurality of pixels, the image processing apparatus comprising: a processor configured to perform defective pixel correction on an image signal outputted from a defective pixel among the plurality of pixels, wherein the processor changes a defective-pixel-correction parameter used in the defective pixel correction based on at least one of a moving velocity and a moving direction of a photographic angle of view of the image sensor.

Further, according to the present invention, provided is an image processing apparatus that processes an image acquired by an image sensor including a two-dimensional array of a plurality of pixels, the image processing apparatus comprising: a processor configured to perform defective pixel correction on an image signal outputted from a defective pixel among the plurality of pixels, wherein the processor changes a defective-pixel-correction parameter used in the defective pixel correction based on at least one of a moving velocity and a moving direction of a target in an image acquired by the image sensor.

Further, according to the present invention, provided is an image processing method for correcting an image signal outputted from a defective pixel of an image sensor comprising a two-dimensional array of a plurality of pixels, the method comprising: changing a defective-pixel-correction parameter to be used in defective pixel correction based on at least one of a moving velocity and a moving direction of a photographic angle of view of the image sensor; and performing the defective pixel correction on the image signal outputted from the defective pixel using the defective-pixel-correction parameter.

Further, according to the present invention, provided is an image processing method for correcting an image signal outputted from a defective pixel of an image sensor including a two-dimensional array of a plurality of pixels, the method comprising: changing a defective-pixel-correction parameter to be used in defective pixel correction based on at least one of a moving velocity and a moving direction of a target in an image acquired by the image sensor; and performing the defective pixel correction on the image signal outputted from the defective pixel using the defective-pixel-correction parameter.

Further, according to the present invention, provided is a non-transitory computer-readable storage medium storing a program to cause a computer to execute an image processing method for correcting an image signal outputted from a defective pixel of an image sensor comprising a two-dimensional array of a plurality of pixels, the method comprising: changing a defective-pixel-correction parameter to be used in defective pixel correction based on at least one of a moving velocity and a moving direction of a photographic angle of view of the image sensor; and performing the defective pixel correction on the image signal outputted from the defective pixel using the defective-pixel-correction parameter.

Further, according to the present invention, provided is a non-transitory computer-readable storage medium storing a program to cause a computer to execute an image processing method for correcting an image signal outputted from a defective pixel of an image sensor including a two-dimensional array of a plurality of pixels, the method comprising: changing a defective-pixel-correction parameter to be used in defective pixel correction based on at least one of a moving velocity and a moving direction of a target in an image acquired by the image sensor; and performing the defective pixel correction on the image signal outputted from the defective pixel using the defective-pixel-correction parameter.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention, and together with the description, serve to explain the principles of the invention.

FIGS. 5A to 5D illustrate diagrams for explaining a method of determining positions of reference pixels used in defective pixel correction according to the first and second embodiments.

DESCRIPTION OF THE EMBODIMENTS

Exemplary embodiments of the present invention will be described in detail in accordance with the accompanying drawings.

First Embodiment

A first embodiment of the present invention will now be described. Described below is an example image capturing system according to the first embodiment including a video camera mounted on an electric platform. The configuration of the image capturing system and the processes performed by the components of the image capturing system according to this embodiment will now be described with reference to FIGS. 1 and 2, and then a process of defective pixel correction will be described.

System Configuration and Processes Performed by Components

Figure 1:
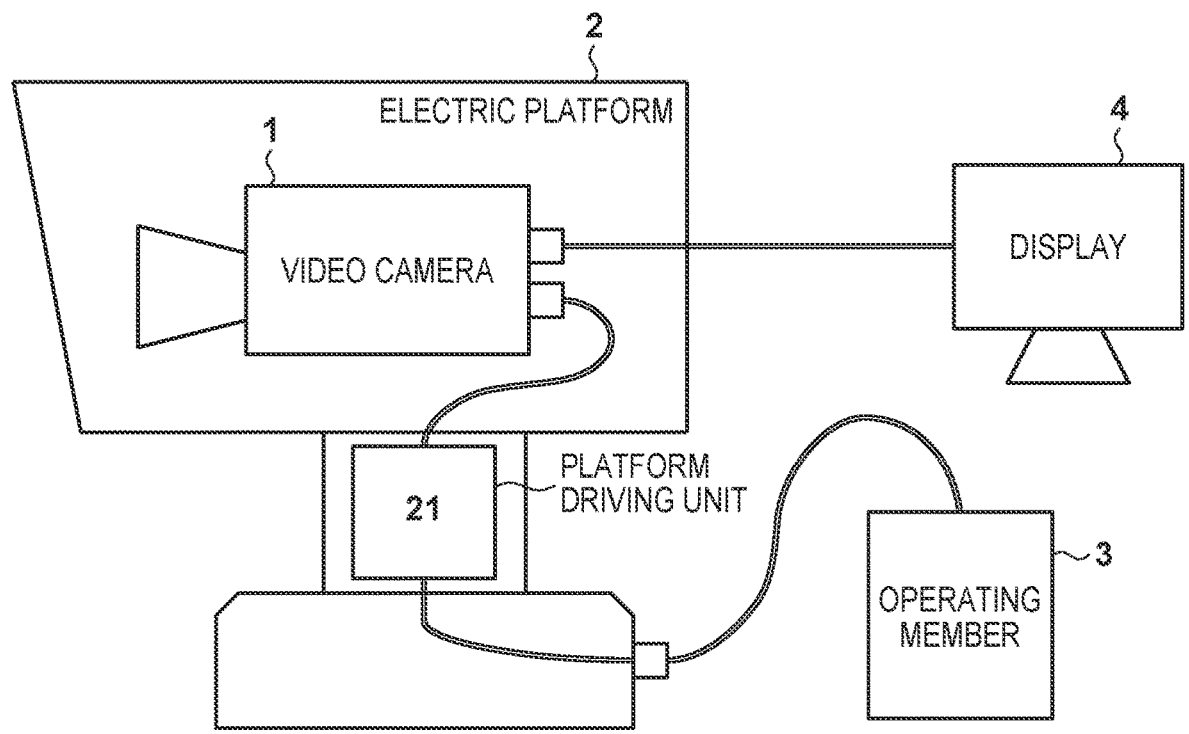
FIG. 1 illustrates an example configuration of an image capturing system according to a first embodiment of the present invention.

FIG. 1 illustrates the configuration of the image capturing system according to the first embodiment of the present invention. The image capturing system according to the first embodiment includes a video camera 1, an electric platform 2, an operating member 3, and a display 4.

The video camera 1 is mounted on the electric platform 2, and the video camera 1 pointed to a predetermined direction by the electric platform 2 captures a moving image, and outputs image signals. The internal configuration of the video camera 1 will be described below.

The electric platform 2 equipped with the video camera 1 is driven by a platform driving unit 21 in a panning/tilting motion to change the image capturing direction of the video camera 1. The platform driving unit 21 receives a control signal from the operating member 3 and drives the electric platform 2 in a panning/tilting motion in accordance with the control signal. While driving the electric platform 2, the platform driving unit 21 sends the positional information (panning/tilting position) of the electric platform 2 to the video camera 1.

The operating member 3 controls the panning/tilting motion of the electric platform 2 through the platform driving unit 21. The display 4 displays the image signals outputted from the video camera 1.

Figure 2:
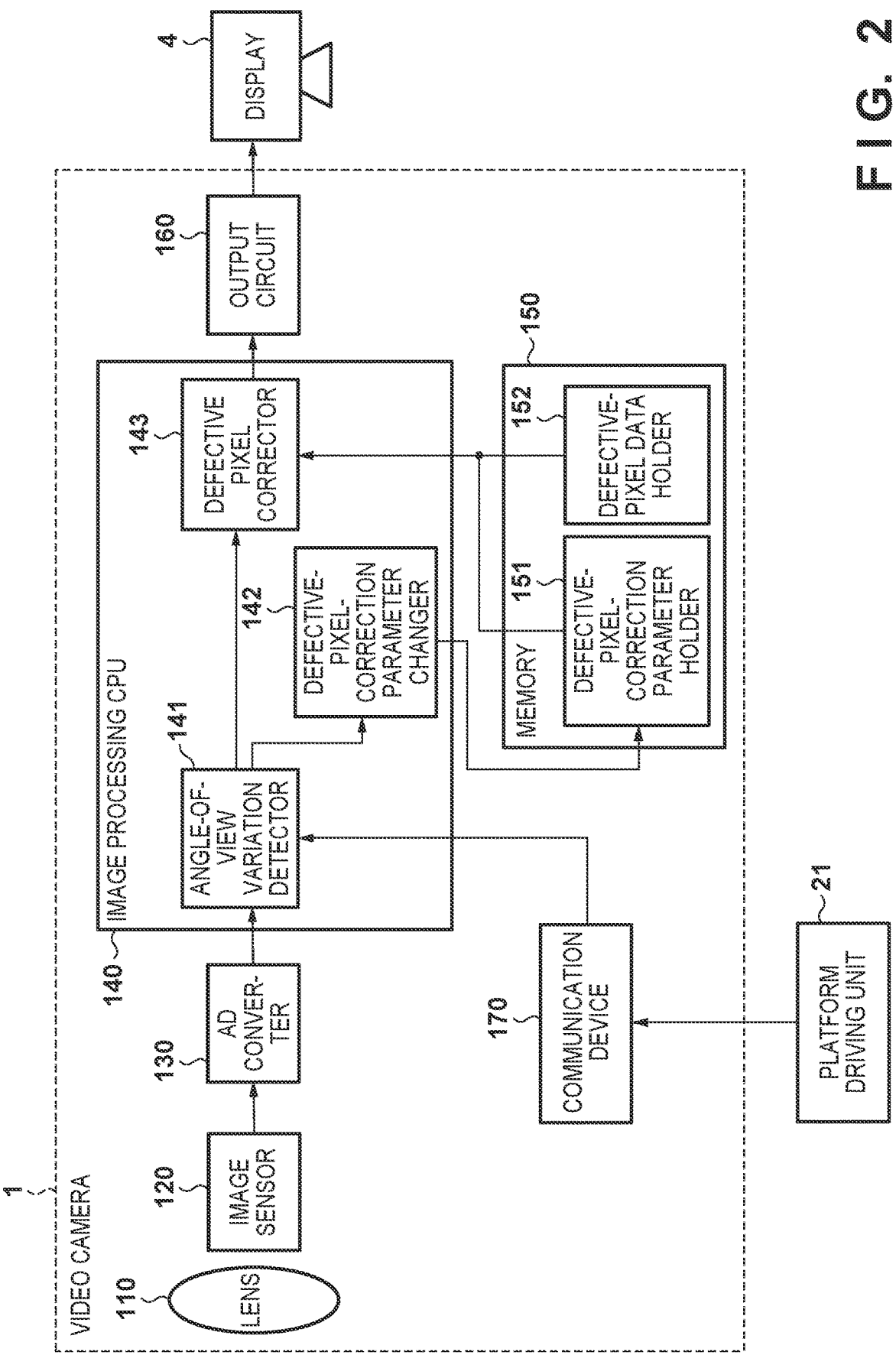
FIG. 2 is a block diagram illustrating a brief configuration of a video camera according to the first embodiment.

The overall configuration of the video camera 1 will now be described with reference to FIG. 2. The video camera 1 includes a lens 110, an image sensor 120, an analog-to-digital (AD) converter 130, an image processing central processing unit (CPU) 140, a memory 150, an output circuit 160, and a communication device 170.

The lens 110 forms an optical image of incident light on the image sensor 120. In FIG. 2, the lens 110 is illustrated as a single lens, but the lens 110 actually includes a plurality of lenses and a diaphragm that adjusts the amount of light passing through the lenses. The lens 110 may be integrated with the video camera 1 or detachable from the video camera 1.

The image sensor 120 converts an optical image formed with the lens 110 on a light-receiving surface of the image sensor 120 to an electrical signal and sends the electrical signal to the AD converter 130. The light-receiving surface of the image sensor 120 includes a two-dimensional array of pixels, and each of the pixels generates an electrical signal corresponding to the light incident on the pixel, to capture an image. Characteristically, the image sensor 120 may include some pixels that are defective, and such defective pixels output electrical signals having an abnormal level not in accordance with the incident light. Thus, in this embodiment, the image processing CPU 140 performs a later-described defective pixel correction process to correct the electrical signal outputted from such a defective pixel.

The memory 150 includes a defective-pixel-correction parameter holder 151 and a defective-pixel data holder 152, each holder holding information associated with the defective pixels in the image sensor 120. In this embodiment, the position of a defective pixel on the image sensor 120 and the difference in the levels of the defective pixel and a normal pixel are preliminarily stored in the defective-pixel data holder 152 of the memory 150 as defective pixel data.

The AD converter 130 performs AD conversion on the electrical signals converted by the image sensor 120 and outputs image data formed by pixel data that is the converted digital signals.

The image processing CPU 140 includes an angle-of-view variation detector 141, a defective-pixel-correction parameter changer 142, and a defective pixel corrector 143, and the image processing CPU 140 performs image processing on the image data outputted from the AD converter 130 and sends the processed image data to the output circuit 160. The angle-of-view variation detector 141, the defective-pixel-correction parameter changer 142, and the defective pixel corrector 143 are schematic representations of processes performed by the image processing CPU 140 in accordance with programs stored in a ROM (not illustrated). The angle-of-view variation detector 141 acquires positional information on the pan and tilt directions from the platform driving unit 21 via the communication device 170 and calculates the variation in the angle of view of an image to be captured by the video camera 1.

Figure 3:
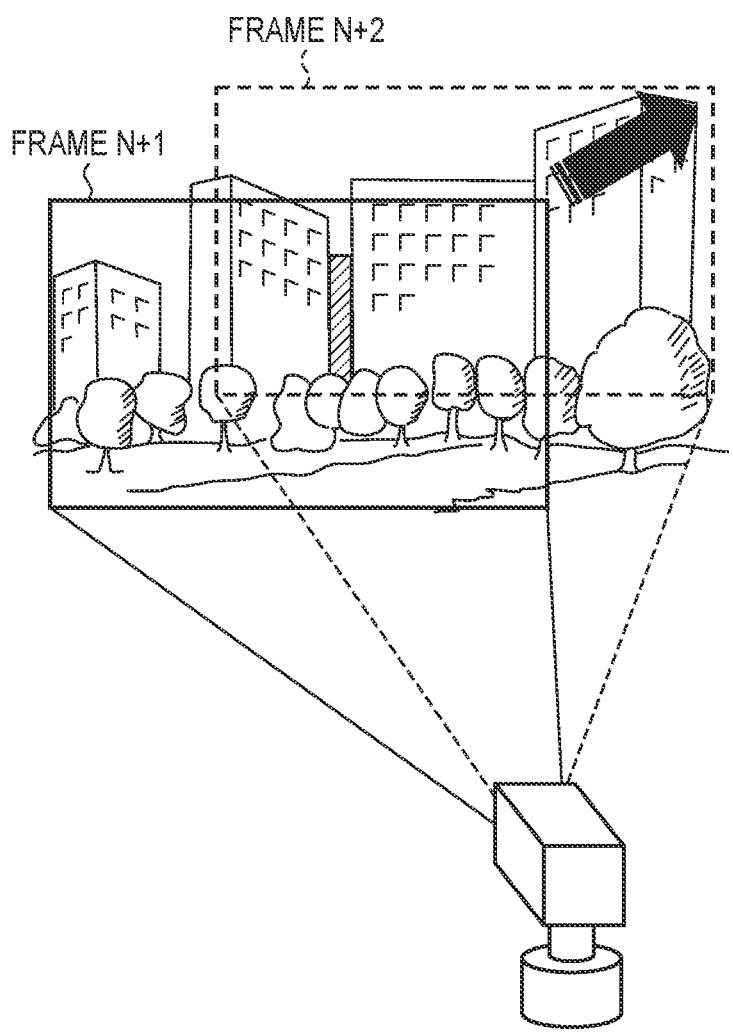
FIG. 3 illustrates capturing of a moving image according to the first embodiment.

FIG. 3 illustrates the capturing of a moving image with the video camera 1 mounted on the electric platform 2 while the electric platform 2 is driven in panning/tilting motions. When a moving image is captured as in FIG. 3, the image data outputted from the image sensor 120 and the AD converter 130 is sent to the angle-of-view variation detector 141 in the form of temporally consecutive frames. The angle-of-view variation detector 141 acquires positional information on the pan and tilt directions driven by the platform driving unit 21 during image capturing of two consecutive frames (frames N+1 and N+2 in FIG. 3), and calculates the shift in the photographic angle of view based on the difference between the positional information of these frames. The shift in the angle of view is determined from the following equation (1):

$$V\_angle = \sqrt{(\Delta P\_pan^2 + \Delta P\_tilt^2)} \quad (1)$$

where V_angle is the shift in the photographic angle of view between the frames, ΔP_pan is the positional difference in the pan direction between the frames, and ΔP_tilt is the positional difference in the tilt direction between the frames.

The defective-pixel-correction parameter changer 142 changes defective pixel correction parameters in accordance with the shift V_angle and the moving direction of the angle of view calculated by the angle-of-view variation detector 141. The determined shift V_angle can also be defined as the moving velocity per frame. When the pan direction is the x axis direction and the tilt direction is the y axis direction, the moving direction can be determined from, for example, the tilt of ΔP_tilt relative to ΔP_pan or an arc tangent. The defective pixel correction parameter corresponds to a threshold used to determine whether to correct a defective pixel (hereinafter, referred to as "defective-pixel-correction threshold") and a position of a reference pixel at a time of performing defective pixel correction.

Figure 4:
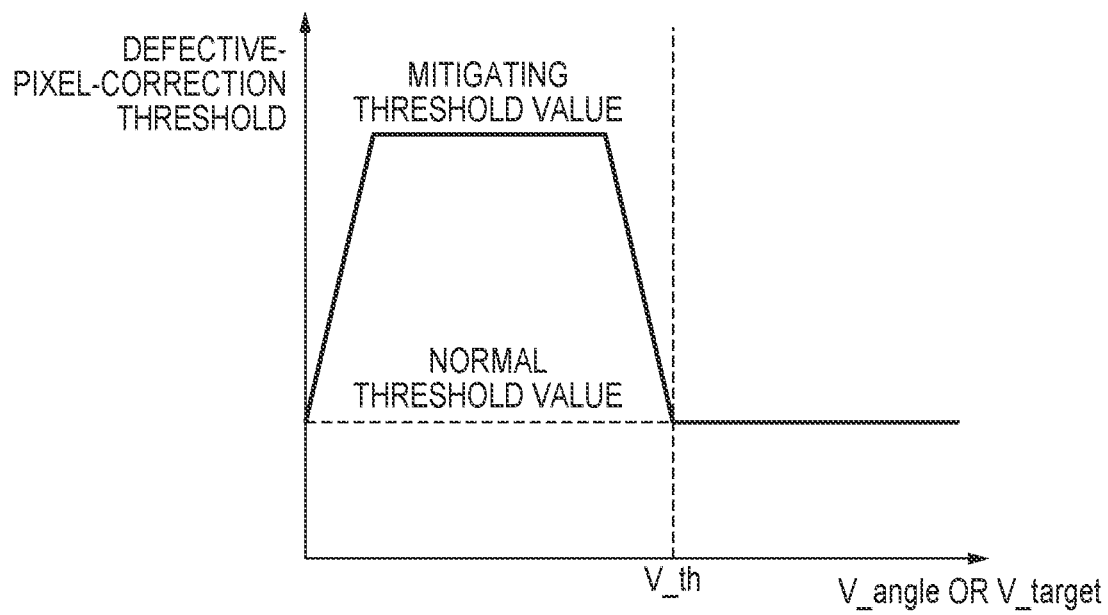
FIG. 4 illustrates a diagram for explaining a method of determining a defective-pixel-correction threshold according to first and second embodiments.

FIG. 4 illustrates a method of determining the defective-pixel-correction threshold by the defective-pixel-correction parameter changer 142. When the shift V_angle (moving velocity) of the angle of view is zero or larger than or equal to a predetermined threshold V_th, the defective-pixel-correction threshold is set to a normal threshold value, whereas when shift V_angle of the angle of view is any other value (when the angle of view is gradually changing), the defective-pixel-correction threshold is set to a mitigating threshold value having a higher level than that of the normal threshold.

FIGS. 5A to 5D illustrate figures for explaining a method of determining reference pixels to be used for defective pixel correction by the defective-pixel-correction parameter changer 142. In this embodiment, the pixel array of the image sensor 120 has a four-channel Bayer arrangement in which the pixels are covered with filters of a plurality of different colors. The red pixels are denoted by R, the blue pixels by B, and the green pixels by Gr and Gb. In the example illustrated in FIGS. 5A to 5D, the B pixel in the bold line box is a defective pixel outputting a voltage of an abnormal level regardless of the intensity of light, and in this case, pixels surrounding the defective pixel and having the same color as that of the defective pixel (blue (B) pixels in this case) are selected to be reference pixels, and the pixel data of these reference pixels is used in defective pixel correction.

Figures 5A, 5B, 5C, 5D:
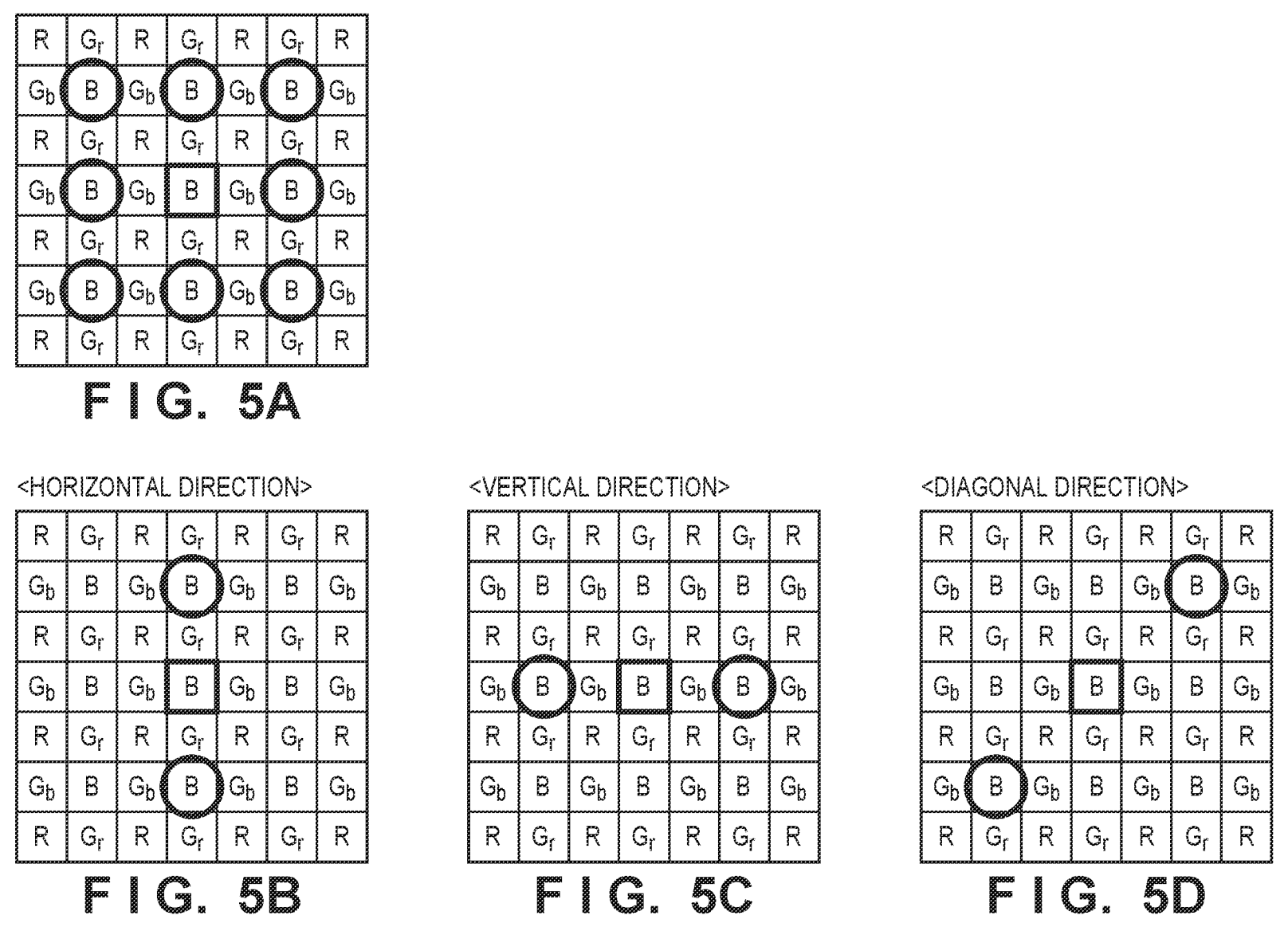

FIG. 5A illustrates a case in which the angle of view is constant, and in such a case, eight same-color pixels adjacent around the defective pixel are selected as reference pixels to be used in defective pixel correction. In contrast, when the angle of view varies as a result of the platform being driven, the reference pixels are changed to be two same-color pixels adjacent to the defective pixel in the direction perpendicular to the moving direction of the angle of view. FIG. 5B illustrates a case in which the moving direction is the horizontal direction, and in this case, two same-color pixels above and below the defective pixel are selected as reference pixels to be used in defective pixel correction. FIG. 5C illustrates a case in which the moving direction is the vertical direction, and in this case, two same-color pixels on the left and right of the defective pixel are selected as reference pixels to be used in defective pixel correction. FIG. 5D illustrates a case in which the moving direction is a diagonal direction, and in this case, two same-color pixels adjacent in a direction orthogonal to the moving direction are selected as reference pixels to be used in defective pixel correction.

After the defective-pixel-correction parameters are determined through the methods illustrated in FIG. 4 and FIGS. 5A to 5D, the defective-pixel-correction parameter changer 142 outputs the defective-pixel-correction parameters to the defective-pixel-correction parameter holder 151 in the memory 150. The defective-pixel-correction parameter holder 151 holds the defective-pixel-correction parameters determined or changed by the defective-pixel-correction parameter changer 142 and outputs the defective-pixel-correction parameters in response to a request from the defective pixel corrector 143. In this embodiment, the defective-pixel-correction parameters are changed in accordance with both the shift V_angle and the moving direction of the angle of view, but the defective-pixel-correction parameters may be changed in accordance with either the shift V_angle or the moving direction of the angle of view.

The defective pixel corrector 143 corrects the pixel data corresponding to the defective pixel stored in the defective-pixel data holder 152 among the pieces of image data captured by the image sensor 120, in accordance with the defective-pixel-correction parameters stored in the defective-pixel-correction parameter holder 151. Details of the process of defective pixel correction will be described below.

The output circuit 160 outputs the image data which has undergone defective pixel correction by the defective pixel corrector 143 to the display 4, which is an external unit of the video camera 1. Here, the image data is outputted to the display 4, but the image data may be outputted to any device besides a display, such as a recording device. The communication device 170 exchanges information between the video camera 1 and the platform driving unit 21. In specific, the communication device 170 acquires positional information on the pan and tilt directions outputted from the platform driving unit 21 and sends the positional information to the angle-of-view variation detector 141.

Defective Pixel Correction Process

Figure 6:
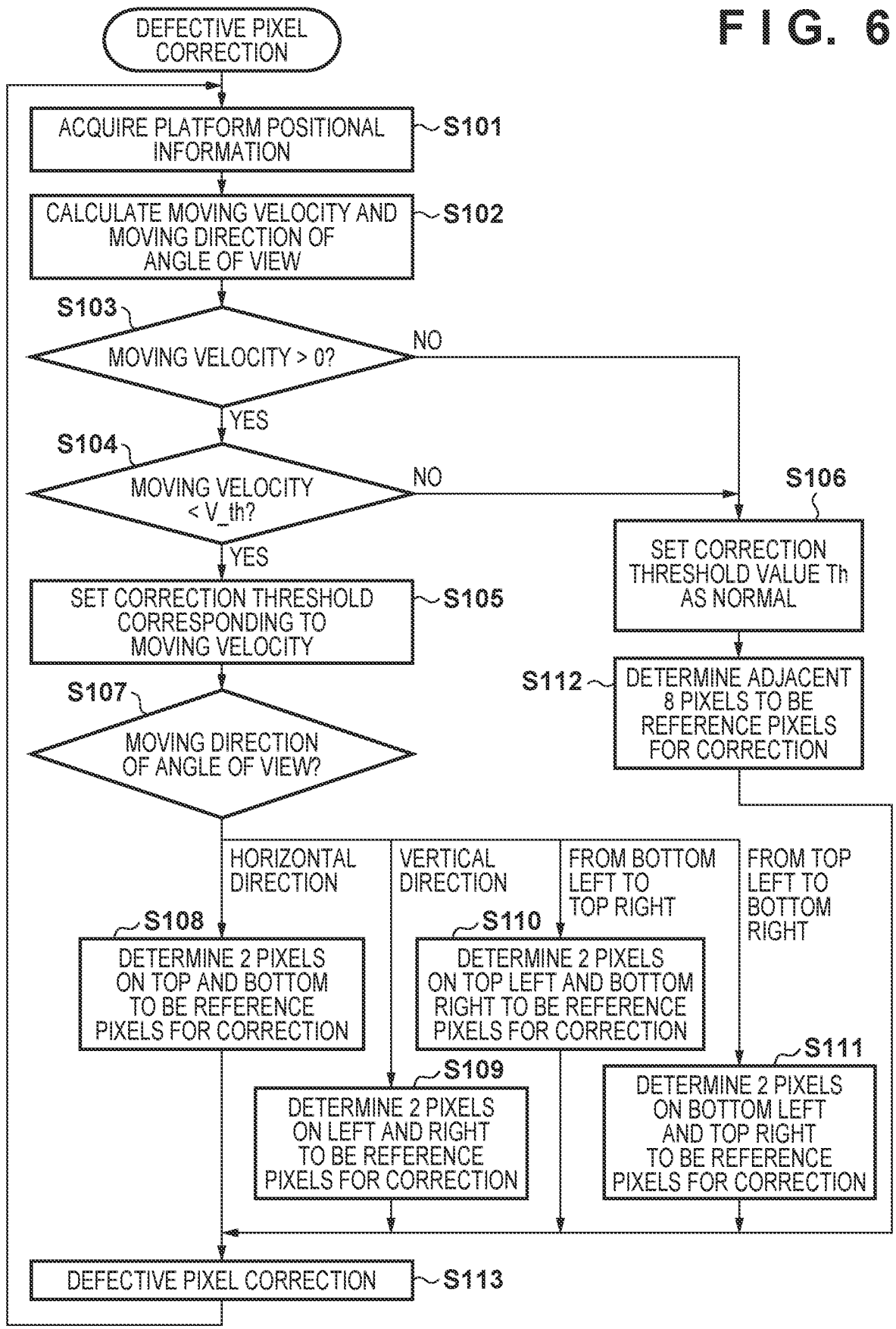
FIG. 6 is a flow chart illustrating a defective pixel correction process according to the first embodiment.

FIG. 6 is a flow chart illustrating a defective pixel correction process according to this embodiment. First, the communication device 170 acquires positional information on the pan and tilt directions from the platform driving unit 21 and outputs the positional information to the angle-of-view variation detector 141 (step S101). The angle-of-view variation detector 141 then calculates the moving velocity and the moving direction of the angle of view captured by the video camera 1 from the positional information acquired from the communication device 170 (step S102).

The defective-pixel-correction parameter changer 142 refers to the shift V_angle (moving velocity) of the angle of view calculated by the angle-of-view variation detector 141 and determines whether the moving velocity is larger than zero (step S103). When the moving velocity is larger than zero (YES in step S103), the defective-pixel-correction parameter changer 142 further determines whether the moving velocity is smaller than the threshold V_th (step S104). When the moving velocity is smaller than the threshold V_th (YES in step S104), the defective-pixel-correction parameter changer 142 sets the defective-pixel-correction threshold to a value larger than the normal threshold in accordance with the shift of the angle of view, as illustrated in FIG. 4. The defective-pixel-correction parameter changer 142 outputs the set defective-pixel-correction threshold to the defective-pixel-correction parameter holder 151 (step S105).

When the moving velocity is determined to be smaller than or equal to zero or determined to be larger than or equal to V_th (larger than or equal to the threshold) in steps S103 and S104, the defective-pixel-correction parameter changer 142 sets the defective-pixel-correction threshold to a predetermined normal value, as illustrated in FIG. 4. The defective-pixel-correction parameter changer 142 outputs the set defective-pixel-correction threshold to the defective-pixel-correction parameter holder 151 (step S106).

Subsequent to step S105, the defective-pixel-correction parameter changer 142 determines the moving direction of the angle of view (step S107).

The defective-pixel-correction parameter changer 142 changes the positions and number of reference pixels for defective pixel correction in accordance with the moving direction of the angle of view, as described above with reference to FIGS. 5A to 5D. When the moving direction is the horizontal direction, the reference pixels are determined to be two same-color pixels above and below the defective pixel (step S108), whereas when the moving direction is the vertical direction, the reference pixels are determined to be two same-color pixels on the left and right of the defective pixel (step S109). When the moving direction is a diagonal direction from the bottom left to the top right, the reference pixels are determined to be two same-color pixels on the top left and the bottom right of the defective pixel (step S110). When the moving direction is a diagonal direction from the top left to the bottom right, the reference pixels are determined to be two pixels on the bottom left and top right of the defective pixel (step S111). When the moving velocity is smaller than or equal to zero or larger than or equal to the threshold V_th, subsequent to step S106, the defective-pixel-correction parameter changer 142 selects eight same-color pixels adjacent around the defective pixel to be the reference pixels for defective pixel correction (step S112). The defective-pixel-correction parameter changer 142 outputs the positions of the selected reference pixels to the defective-pixel-correction parameter holder 151.

Finally, the defective pixel corrector 143 subjects the pixel data corresponding to the defective pixel stored in the defective-pixel data holder 152 to defective pixel correction in accordance with the defective-pixel-correction parameters (the defective-pixel-correction threshold and the positions of the reference pixels) determined as described above (step S113).

In the defective pixel correction process according to the above-described first embodiment, when the variation in the angle of view is gradual, the threshold of the defective pixel correction is increased to reduce the number of defective pixels to be corrected, and the positions of the reference pixels for correction are changed in accordance with the moving direction of the angle of view. Through such changes, improper correction, which is a known drawback in defective pixel correction, can be suppressed.

Second Embodiment

A second embodiment of the present invention will now be described. In the second embodiment, the video camera is fixed during image capturing. The configuration of the video camera and the processes performed by the components of the video camera according to the second embodiment will now be described with reference to FIG. 7. Then, a process of defective pixel correction will be described.

System Configuration and Processes Performed by Components

Figure 7:
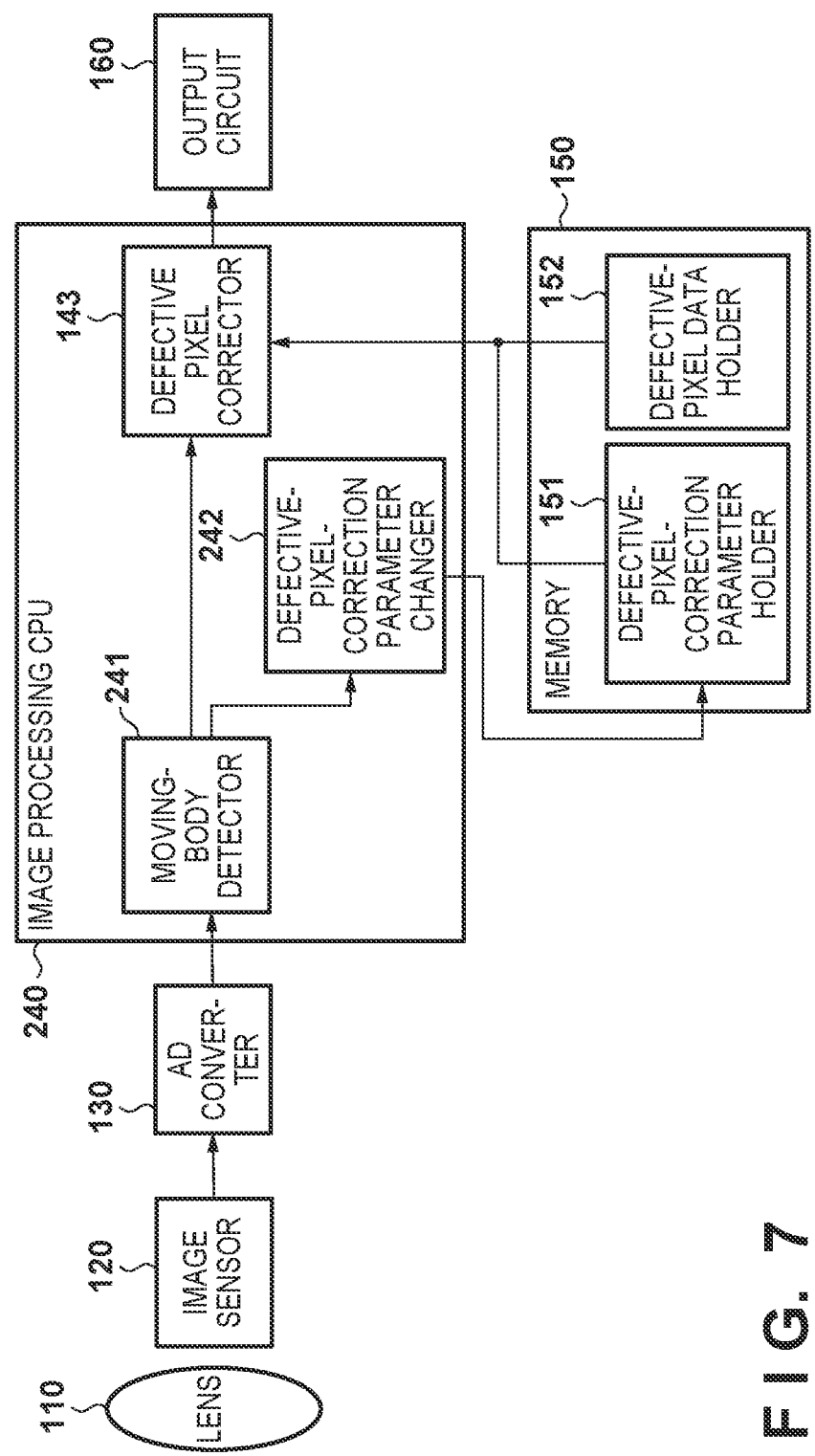
FIG. 7 is a block diagram illustrating an overall configuration of a video camera according to the second embodiment.

FIG. 7 is a block diagram illustrating the overall configuration of a video camera 1' according to the second embodiment. The video camera 1' illustrated in FIG. 7 is different from the video camera 1 illustrated in FIG. 2 in that the communication device 170 is absent, a moving-body detector 241 in an image processing CPU 240 is provided in place of the angle-of-view variation detector 141, and a defective-pixel-correction-parameter changer 242 performs a different process. The other configurations are similar to those illustrated in FIG. 2, and therefore such configurations are denoted by the same reference signs, and descriptions thereof are not repeated.

Figure 8A:
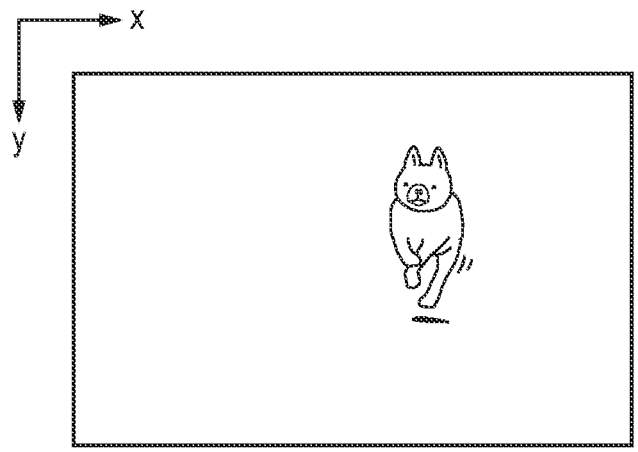
FIGS. 8A and 8B illustrate an example movement of a target captured in a moving image according to the second embodiment.
Figure 8B:
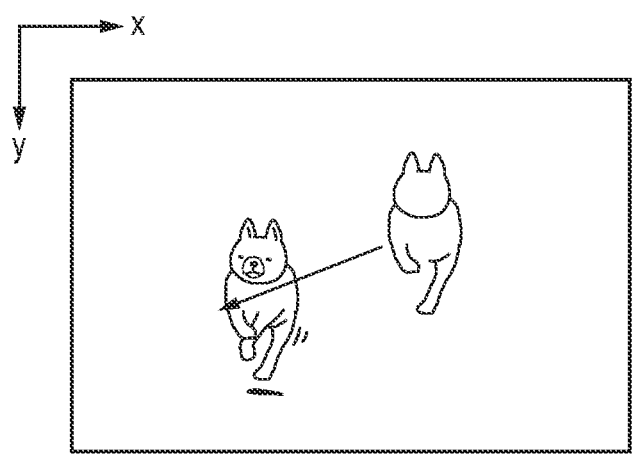

The moving-body detector 241 acquires image data outputted from the AD converter 130, determines whether a moving target (moving body) is within the photographic angle of view, and when there is a moving body, calculates the moving velocity and the moving direction of the moving body. FIGS. 8A and 8B illustrate a moving body within the photographic angle of view. When a moving image is captured as in FIGS. 8A and 8B, the image data outputted from the image sensor 120 and the AD converter 130 is sent to the moving-body detector 241 in the form of temporally consecutive frames. The moving-body detector 241 acquires positions of the target in two consecutive frames (frames N+1 in FIG. 8A and N+2 in FIG. 8B) and calculates the shift and the moving direction of the target from the difference in the positions. The difference in the positions is calculated from the following equation (2):

$$V\_target = \sqrt{(\Delta x^2 + \Delta y^2)} \qquad (2)$$

where V_target is the shift of the target between the frames, Δx is the positional difference in the x direction, and Δy is the positional difference in the y direction.

The defective-pixel-correction-parameter changer 242 changes the defective-pixel-correction parameters in accordance with the shift V_target and the moving direction calculated by the moving-body detector 241. The shift V_target can also be defined as the moving velocity per frame. The moving direction can be determined on the basis of, for example, the gradient of the positional difference Δy in the y direction relative to the positional difference Δx in the x direction or an arc tangent. The method of determining a defective-pixel-correction threshold by the defective-pixel-correction-parameter changer 242 is similar to that according to the first embodiment illustrated in FIG. 4. The method of determining the positions of reference pixels for defective pixel correction by the defective-pixel-correction-parameter changer 242 is similar to that according to the first embodiment illustrated in FIGS. 5A to 5D. In this embodiment as well, the defective-pixel-correction parameters may be changed in accordance with either the shift V_target or the moving direction of the target.

Process of Defective Pixel Correction

Figure 9:
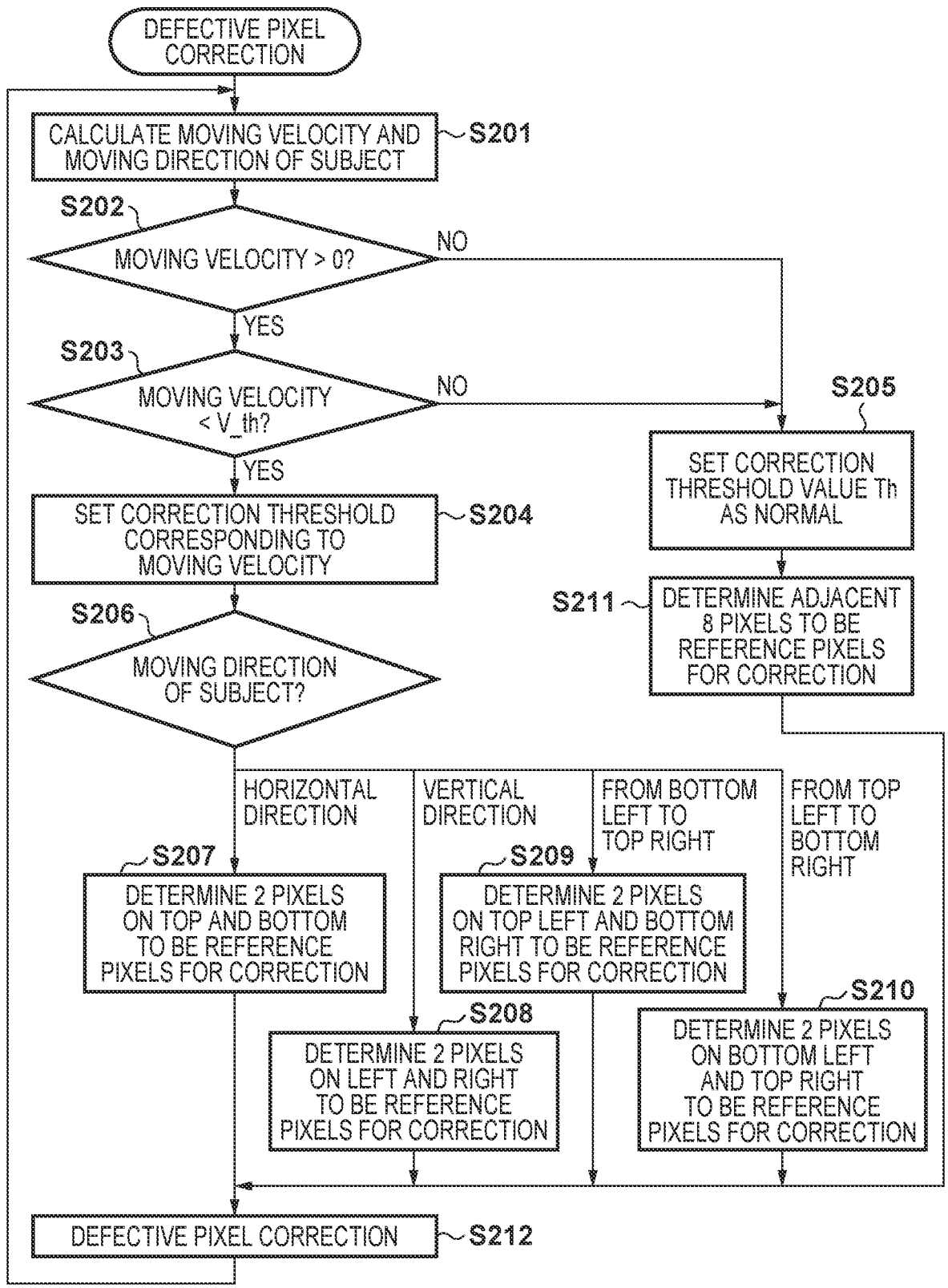
FIG. 9 is a flow chart illustrating a defective pixel correction process according to the second embodiment.

FIG. 9 is a flow chart illustrating a process of defective pixel correction according to the second embodiment. First, the moving-body detector 241 calculates the moving velocity and the moving direction of a target from two temporally consecutive frames (step S201). Then, the defective-pixel-correction-parameter changer 242 refers to the moving velocity of the target calculated by the moving-body detector 241 and determines whether the moving velocity is larger than zero (step S202). When the moving velocity is larger than zero (YES in step S202), the defective-pixel-correction-parameter changer 242 further determines whether the moving velocity is smaller than V_th (smaller than the threshold value) (step S203). When the moving velocity is smaller than the threshold V_th (YES in step S203), the defective-pixel-correction-parameter changer 242 sets the defective-pixel-correction threshold to a value larger than the normal threshold in accordance with the moving velocity, as illustrated in FIG. 4. The defective-pixel-correction-parameter changer 242 outputs the set defective-pixel-correction threshold to the defective-pixel-correction parameter holder 151 (step S204).

When the moving velocity is determined to be zero or determined to be larger than or equal to V_th (larger than or equal to the threshold) in steps S202 and S203, the defective-pixel-correction-parameter changer 242 sets the defective-pixel-correction threshold to a predetermined normal value, as illustrated in FIG. 4. The defective-pixel-correction-parameter changer 242 outputs the set defective-pixel-correction threshold to the defective-pixel-correction parameter holder 151 (step S205).

Subsequent to step S204, the defective-pixel-correction-parameter changer 242 determines the moving direction of the target (step S206).

The defective-pixel-correction-parameter changer 242 changes the positions of the reference pixels for defective pixel correction in accordance with the moving direction, as illustrated in FIGS. 5A to 5D. When the moving direction is the horizontal direction, the reference pixels are determined to be two same-color pixels above and below the defective pixel (step S207), whereas when the moving direction is the vertical direction, the reference pixels are determined to be two same-color pixels on the left and right of the defective pixel (step S208). When the moving direction is a diagonal direction from the bottom left to the top right, the reference pixels are determined to be two same-color pixels on the top left and the bottom right of the defective pixel (step S209). When the moving direction is a diagonal direction from the top left to the bottom right, the reference pixels are determined to be two pixels on the bottom left and top right of the defective pixel (step S210). When the moving velocity is equal to zero or larger than or equal to the threshold V_th, subsequent to step S205, the defective-pixel-correction parameter changer 242 selects eight same-color pixels adjacent around the defective pixel to be the reference pixels for defective pixel correction (step S211). The defective-pixel-correction parameter changer 242 outputs the positions of the selected reference pixels to the defective-pixel-correction parameter holder 151.

Finally, the defective pixel corrector 143 subjects the pixel data corresponding to the defective pixel stored in the defective-pixel data holder 152 to defective pixel correction in accordance with the defective-pixel-correction parameters (the defective-pixel-correction threshold and the positions of the reference pixels) determined as described above (step S212).

In the defective pixel correction process according to the above-described second embodiment, when the moving velocity of the target is gradual, the threshold of the defective pixel correction is increased to reduce the number of defective pixels to be corrected, and the positions of the reference pixels for correction are changed in accordance with the moving direction of the target. Through such changes, improper correction, which is a known drawback in defective pixel correction, can be suppressed.

In the first and second embodiments described above, the reference pixels are two pixels having the same color as the defective pixel, as illustrated in FIGS. 5B to 5D, but the number of reference pixels is not limited to two in the present invention, and may be three or more. In such a case, the reference pixels may be weighted such that those farther from the defective pixel are weighted lower. In the example illustrated in FIG. 5A, the reference pixels are eight pixels having the same color as the defective pixel, but the number of reference pixels according to the present invention is not limited to eight, and may be, for example, four or nine or more. In such a case as well, the reference pixels may be weighted such that those farther from the defective pixel are weighted lower.

Modification

Figure 10:
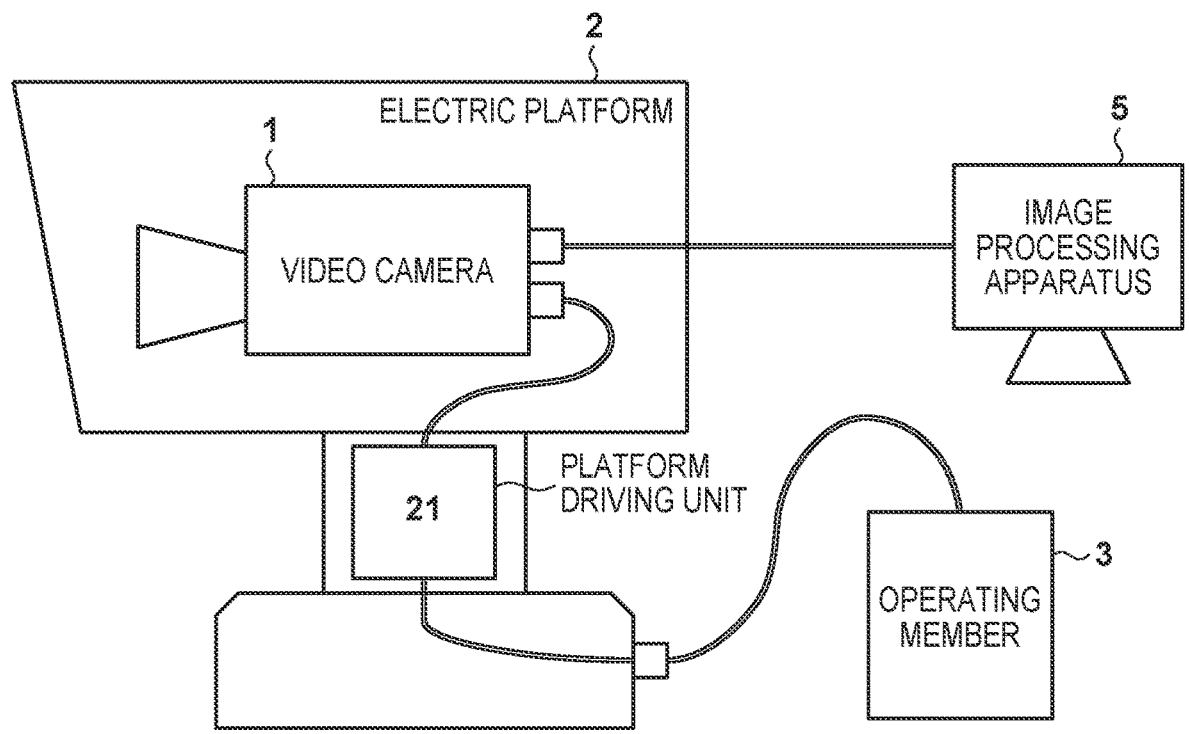
FIG. 10 illustrates an example configuration of an image capturing system according to a modification.

In the first and second embodiments described above, the defective pixel correction process is performed in the image capturing apparatus (video camera 1, video camera 1'), but the images acquired by the image capturing apparatus may be processed by an external image processing apparatus. FIG. 10 illustrates an example image capturing system according to this modification.

In such a case, the image data includes the position of the defective pixel in the form of meta data, and when a platform is used (in the case of the first embodiment), the image data includes positional information on the pan and tilt directions driven by the platform driving unit 21 during image capturing. The image processing apparatus 5 calculates defective-pixel-correction parameters on the basis of such information included in the image data, and thus can perform the processes similar to those according to the first and second embodiments described above.

The configurations of hardware and software realizing the functions of the embodiments described above are also not limited to the configurations of the systems described above.

Other Embodiments

Embodiment(s) of the present invention can also be realized by a computer of a system or apparatus that reads out and executes computer executable instructions (e.g., one or more programs) recorded on a storage medium (which may also be referred to more fully as anon-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-099794, filed on May 24, 2018 which is hereby incorporated by reference herein in its entirety.

What is claimed is:

1. An imaging capturing apparatus comprising:
    an image sensor including a two-dimensional array of a plurality of pixels; and
    a processor configured to perform defective pixel correction on an image signal outputted from a defective pixel among the plurality of pixels,
    wherein the processor changes a defective-pixel-correction parameter used in the defective pixel correction based on at least one of a moving velocity and a moving direction of a photographic angle of view of the image sensor.

2. The image capturing apparatus according to claim 1, wherein,
    the image capturing apparatus is disposed on a platform, and
    the moving velocity and the moving direction of the photographic angle of view are based on a movement of the platform.

3. The image capturing apparatus according to claim 1, wherein the defective-pixel-correction parameter includes a correction threshold for determining whether the image signal outputted from the defective pixel is to be corrected.

4. The image capturing apparatus according to claim 3, wherein the processor changes the correction threshold to a value larger than a predetermined threshold in a case where the moving velocity is larger than zero and smaller than a predetermined threshold.

5. The image capturing apparatus according to claim 1, wherein,
    the processor performs the defective pixel correction on the image signal outputted from the defective pixel using an image signal outputted from a reference pixel, and
    the defective-pixel-correction parameter includes a position of the reference pixel to be used in the defective pixel correction.

6. The image capturing apparatus according to claim 5, wherein in a case where the moving velocity is larger than zero and smaller than a predetermined threshold, the processor selects a smaller number of reference pixels in comparison to the number of reference pixels selected if the moving velocity is equal to zero or larger than or equal to the predetermined threshold.

7. The image capturing apparatus according to claim 5, wherein the processor determines a position of a pixel positioned in a direction perpendicular to the moving direction to be the position of the reference pixel.

8. The image capturing apparatus according to claim 5, wherein,
    the plurality of pixels is covered with a plurality of filters of a plurality of colors, and
    the processor determines the position of the reference pixel to be a position of an adjacent pixel covered with a filter having the same color as the filter covering the defective pixel.

9. The image capturing apparatus according to claim 1, wherein,
    the processor performs the defective pixel correction on the image signal outputted from the defective pixel using an image signal outputted from a reference pixel, and
    the defective-pixel-correction parameter includes a correction threshold for determining whether the image signal outputted from the defective pixel is to be corrected and a position of the reference pixel to be used in the defective pixel correction.

10. An image processing apparatus that processes an image acquired by an image sensor including a two-dimensional array of a plurality of pixels, the image processing apparatus comprising:
    a processor configured to perform defective pixel correction on an image signal outputted from a defective pixel among the plurality of pixels,
    wherein the processor changes a defective-pixel-correction parameter used in the defective pixel correction based on at least one of a moving velocity and a moving direction of a photographic angle of view of the image sensor.

11. An image processing method for correcting an image signal outputted from a defective pixel of an image sensor comprising a two-dimensional array of a plurality of pixels, the method comprising:
    changing a defective-pixel-correction parameter to be used in defective pixel correction based on at least one of a moving velocity and a moving direction of a photographic angle of view of the image sensor; and performing the defective pixel correction on the image signal outputted from the defective pixel using the defective-pixel-correction parameter.

12. The image processing method according to claim 11, wherein,
an image capturing apparatus including the image sensor is disposed on a platform, and
the moving velocity and the moving direction of the photographic angle of view are based on a movement of the platform.

13. The image processing method according to claim 11, wherein the defective-pixel-correction parameter includes a correction threshold for determining whether the image signal outputted from the defective pixel is to be corrected.

14. The image processing method according to claim 13, wherein the correction threshold is changed to a value larger than a predetermined threshold in a case where the moving velocity is larger than zero and smaller than a predetermined threshold.

15. The image processing method according to claim 11, further comprising:
performing the defective pixel correction on the image signal outputted from the defective pixel using an image signal outputted from a reference pixel,
wherein the defective-pixel-correction parameter includes a position of the reference pixel to be used in the defective pixel correction.

16. The image processing method according to claim 15, wherein in a case where the moving velocity is larger than zero and smaller than a predetermined threshold, a smaller number of reference pixels are selected in comparison to the number of reference pixels selected if the moving velocity is equal to zero or larger than or equal to the predetermined threshold.

17. A non-transitory computer-readable storage medium storing a program to cause a computer to execute an image processing method for correcting an image signal outputted from a defective pixel of an image sensor comprising a two-dimensional array of a plurality of pixels, the method comprising:
changing a defective-pixel-correction parameter to be used in defective pixel correction based on at least one of a moving velocity and a moving direction of a photographic angle of view of the image sensor; and
performing the defective pixel correction on the image signal outputted from the defective pixel using the defective-pixel-correction parameter.

* * * * *